US009657941B2

(12) United States Patent
Tsantrizos et al.

(10) Patent No.: US 9,657,941 B2
(45) Date of Patent: May 23, 2017

(54) METHOD AND APPARATUS FOR GASIFICATION OF ORGANIC WASTE

(75) Inventors: Panayotis Tsantrizos, Montreal (CA); Stephan Lavigne, Delson (CA)

(73) Assignee: PROTERRGO INC., Montreal, QC (CA)

(*) Notice: Subject to any disclaimer, the term of this patent is extended or adjusted under 35 U.S.C. 154(b) by 404 days.

(21) Appl. No.: 13/264,986

(22) PCT Filed: Apr. 19, 2010

(86) PCT No.: PCT/CA2010/000545
§ 371 (c)(1),
(2), (4) Date: Nov. 30, 2011

(87) PCT Pub. No.: WO2010/118513
PCT Pub. Date: Oct. 21, 2010

(65) Prior Publication Data
US 2012/0122046 A1 May 17, 2012

Related U.S. Application Data

(60) Provisional application No. 61/170,228, filed on Apr. 17, 2009.

(51) Int. Cl.
F27D 19/00 (2006.01)
F23G 5/027 (2006.01)
(Continued)

(52) U.S. Cl.
CPC .............. *F23G 5/027* (2013.01); *B01D 53/62* (2013.01); *C10J 3/02* (2013.01); *F23G 5/0273* (2013.01);
(Continued)

(58) Field of Classification Search
CPC .... F23G 5/027; F23G 5/0273; F23G 2201/40; F23G 2202/106; F23G 2207/101; F23G 2209/28; F23G 2900/55003
(Continued)

(56) References Cited

U.S. PATENT DOCUMENTS 4,756,722 A 7/1988 Knop et al.
5,028,241 A * 7/1991 Kooiman .................. C10J 3/26
48/128

(Continued)

FOREIGN PATENT DOCUMENTS

CA 2028915 C 5/1991
CA 2623978 A1 4/2007
(Continued)

OTHER PUBLICATIONS

Gasification reactions and transformations.*
(Continued)

*Primary Examiner* — Alissa Tompkins
*Assistant Examiner* — Nathaniel Herzfeld
(74) *Attorney, Agent, or Firm* — Anglehart et al.

(57) ABSTRACT

The gasifier operates to mix a start up heat source with crude syngas combustion for driving gasification of waste. Combustion flue gas can be maintained above 650° C. until reaching a quench to prevent formation of dioxins. Excess heat is liberated through a heat recovery unit. The gasifier can operate in a batch mode to process small batches of waste efficiently for small installations, such as ships, apartment buildings, hospitals and residences.

18 Claims, 3 Drawing Sheets

(51) Int. Cl.

| | |
|---|---|
| *F23G 5/50* | (2006.01) |
| *F23J 15/06* | (2006.01) |
| *F23L 7/00* | (2006.01) |
| *F23N 5/00* | (2006.01) |
| *C10J 3/02* | (2006.01) |
| *B01D 53/62* | (2006.01) |
| *C10J 3/72* | (2006.01) |
| *B01D 53/78* | (2006.01) |

(52) U.S. Cl.
CPC .............. *F23G 5/50* (2013.01); *F23J 15/06* (2013.01); *F23L 7/002* (2013.01); *F23N 5/006* (2013.01); *B01D 53/78* (2013.01); *B01D 2251/304* (2013.01); *B01D 2257/504* (2013.01); *B01D 2258/0291* (2013.01); *C10J 3/726* (2013.01); *C10J 2300/0946* (2013.01); *C10J 2300/0956* (2013.01); *C10J 2300/1215* (2013.01); *C10J 2300/1246* (2013.01); *F23G 2201/303* (2013.01); *F23G 2207/101* (2013.01); *F23G 2207/103* (2013.01); *F23G 2207/30* (2013.01); *F23G 2207/50* (2013.01); *Y02C 10/04* (2013.01); *Y02E 20/326* (2013.01); *Y02E 20/363* (2013.01); *Y02E 50/32* (2013.01); *Y02P 20/152* (2015.11)

(58) Field of Classification Search
USPC .................. 432/2, 37; 48/119, 123, 197 FM
See application file for complete search history.

(56) References Cited

U.S. PATENT DOCUMENTS

| | | | | |
|---|---|---|---|---|
| 5,033,450 | A * | 7/1991 | Schmidt | F24C 1/14 126/92 B |
| 5,611,289 | A | 3/1997 | Brookes | |
| 5,922,090 | A | 7/1999 | Fujimura et al. | |
| 6,076,476 | A * | 6/2000 | Yano et al. | 110/345 |
| 6,448,441 | B1 | 9/2002 | Wing-Chiu et al. | |
| 6,648,932 | B1 | 11/2003 | Maton | |
| 6,746,497 | B1 * | 6/2004 | Kaneko | F23G 5/0276 201/1 |
| 7,381,383 | B1 * | 6/2008 | Yokoyama et al. | 422/198 |
| 2003/0233788 | A1 | 12/2003 | Lewis | |
| 2004/0050067 | A1 * | 3/2004 | Sprouse | F01K 21/047 60/774 |
| 2005/0166810 | A1 | 8/2005 | Gnedenko et al. | |
| 2006/0065172 | A1 * | 3/2006 | Capote | B09B 3/005 110/250 |
| 2006/0089516 | A1 * | 4/2006 | Giercke | F23G 1/00 585/240 |
| 2006/0112639 | A1 | 6/2006 | Nick et al. | |
| 2007/0099039 | A1 | 5/2007 | Galloway | |
| 2007/0220810 | A1 | 9/2007 | Leveson et al. | |
| 2008/0196308 | A1 * | 8/2008 | Hutton | C10J 3/10 48/210 |
| 2008/0222956 | A1 | 9/2008 | Tsangaris et al. | |
| 2008/0282946 | A1 * | 11/2008 | Morandi | 110/342 |
| 2008/0308017 | A1 * | 12/2008 | Brookes | 110/212 |
| 2009/0031930 | A1 * | 2/2009 | Shen | 110/259 |
| 2009/0060779 | A1 * | 3/2009 | Chambe et al. | 422/4 |
| 2009/0200180 | A1 * | 8/2009 | Capote et al. | 205/744 |
| 2010/0006415 | A1 | 1/2010 | Lee | |
| 2010/0139534 | A1 | 6/2010 | Tsantrizos | |
| 2011/0107669 | A1 * | 5/2011 | Carabin et al. | 48/87 |

FOREIGN PATENT DOCUMENTS

| | | |
|---|---|---|
| CA | 2651406 A1 | 11/2007 |
| CA | 2688080 A1 | 12/2008 |
| CN | 1185826 A | 6/1998 |
| CN | 1314983 A | 9/2001 |
| CN | 1422689 A | 6/2003 |
| CN | 1616886 A | 5/2005 |
| CN | 1769397 A | 5/2006 |
| EP | 1108955 A1 | 6/2001 |
| EP | 1382906 A2 | 1/2004 |
| JP | 60-162116 A | 8/1985 |
| JP | 63-044921 A | 2/1988 |
| JP | 10185135 A * | 7/1998 |
| JP | 10185135 A | 7/1998 |
| JP | 11-159718 A | 6/1999 |
| JP | 2001-341129 A | 12/2001 |
| JP | 2005-517886 A | 6/2005 |
| JP | 2006-343002 A | 12/2006 |
| JP | 2007-298251 A | 11/2007 |
| JP | 2008039365 A | 2/2008 |
| KR | 100846897 B1 | 7/2008 |
| WO | WO 96/40843 A1 | 12/1996 |
| WO | WO 99/66008 A1 | 12/1999 |
| WO | WO 02/083815 A1 | 10/2002 |
| WO | WO2008044216 A1 | 4/2008 |
| WO | WO 2008044216 A1 * | 4/2008 |

OTHER PUBLICATIONS

Gasification chemical reactions.*
International Preliminary Report on Patentability in PCT/CA2010/000545.
International Search Report in PCT/CA2010/000545.
Written Opinion in PCT/CA2010/000545.
Search Report and Opinion of EP application 10764011.2 dated Oct. 10, 2013 with related claims 1-15.
CA 2666431 office action dated Dec. 17, 2013 with related claims.
EP 07826714.3 office action dated Oct. 2, 2013 with related claims.
JP 2012-505004 office action dated Apr. 8, 2014 with related claims.
China application No. 201410347481.3 office action dated Dec. 3, 2015 with related claims.
Mexico application MX/a/2011/010985 2nd office action dated Apr. 4, 2016 with related claims.
Mexico application MX/a/2011/010985 office action dated Sep. 2, 2015 with related claims.
South Korea application 10-2011-7027408 office action dated Dec. 15, 2015 with related claims.

* cited by examiner

METHOD AND APPARATUS FOR GASIFICATION OF ORGANIC WASTE

TECHNICAL FIELD

This invention relates to waste treatment and to gasification of organic material. More specifically, it relates to an improved method and apparatus for the gasification of organic waste in a small-scale installation.

BACKGROUND

Municipal waste is most commonly sent to landfills or incinerated. For many municipalities, landfills are preferred over incineration due to lower infrastructure cost and reduced concerns about immediate air pollution resulting from incineration. The heat resulting from incineration can be used to generate electricity.

Polychlorinated dibenzodioxins (PCDDs), or simply dioxins, are a group of polyhalogenated compounds which are significant because they act as environmental pollutants. Dioxins are produced in small concentrations when organic material is burned in the presence of chlorine, whether the chlorine is present as chloride ions or as organochlorine compounds. Dioxins occur as by-products in the municipal incineration of chlorine-containing substances, such as PVC (polyvinyl chloride). In incineration, dioxins can also form in the atmosphere above the stack as the exhaust gases cool through a temperature window of 650° C. to 250° C. Reducing the quantity of dioxins can be achieved through rapid quenching of the exhaust gases through this 400 degree window. Thus, the problem of dioxin formation is avoided in conventional gasification systems.

Municipal waste gasification plants are not in widespread use, as is the case for incinerators. Gasification plants are commonly used to convert coal into fuel gas. In gasification, the waste is heated in the presence of reduced oxygen or air supply so that a synthesis gas of hydrogen and carbon monoxide is produced.

The synthesis gas can contain tars and a secondary gasifier can be used to convert tars to synthesis gas. Before combusting the synthesis gas, it may be scrubbed to remove contaminants. The synthesis gas can then be used as a fuel supply for power generation or other energy needs. In PCT publication WO2008/044216 dated Apr. 17, 2008, there is described by the Applicant of the present application a waste disposal system that gasifies small batches of waste to produce a clean synthesis fuel gas. A Primary Gasifier chamber is heated by a combustion fuel source with a small amount of introduced air to produce a crude synthesis gas (containing tars) that is then passed to a secondary gasifier chamber that is heated by a combustion or electric fuel source to an optimum gasification temperature to produce synthesis gas essentially free of tars. The synthesis gas can be quenched and cleaned of other contaminants, such as acid gases, and then it can replace a conventional fuel source driving the gasification process as it becomes available. The synthesis gas is decontaminated and the combustion gases resulting from the synthesis gas are clean and can pass directly to the atmosphere as flue gas. When the batch process is completed, a small amount of carbonaceous residue, typically less than 10% of the original volume, and a small amount of various filtered contaminants remain.

SUMMARY

It has been discovered that the production of crude synthesis gas can be controlled so as to allow for efficient scrubbing of flue gases that contain the combustion products of the crude synthesis gas. A secondary gasification system can thus be avoided. In some embodiments, the crude synthesis gas is fed into a suitable high-temperature combustion zone that is equipped with a conventional heat source, typically a hydrocarbon fuel burner, where the synthesis gas is combusted and the hot combustion products are used to heat a gasification chamber. Scrubbing of the flue gas uses equipment that can process a predetermined flow rate of gas. Controlling the heating of the gasifier, as well as controlling the amount of process air allowed into the gasifier can ensure that the amount of crude synthesis gas produced will be within the capability of the scrubbing equipment.

It has also been discovered that combustion of the crude synthesis gas along with combustion of any additional fuel can be controlled to maintain the temperature of the flue gas throughout the heat exchange with the gasification chamber above 650° C. (preferably above 700° C.) until the flue gas is quenched and scrubbed. By controlling the flue gas from dropping below 650° C., the formation of dioxins is greatly reduced. This discovery is useful in the context of a small, batch mode gasifier as well as in the context of a larger, continuous-feed gasifier.

The gasifier operates to mix a start up heat source with crude syngas combustion for driving gasification of waste. Combustion flue gas can be maintained above 650° C. until reaching a quench to prevent formation of dioxins. Excess heat is liberated through a heat recovery unit. The gasifier can operate in a batch mode to process small batches of waste efficiently for small installations, such as ships, apartment buildings, hospitals and residences.

BRIEF DESCRIPTION OF THE DRAWINGS

The invention will be better understood by way of the following detailed description of embodiments of the invention with reference to the appended drawings, in which.

DETAILED DESCRIPTION

Figure 1:
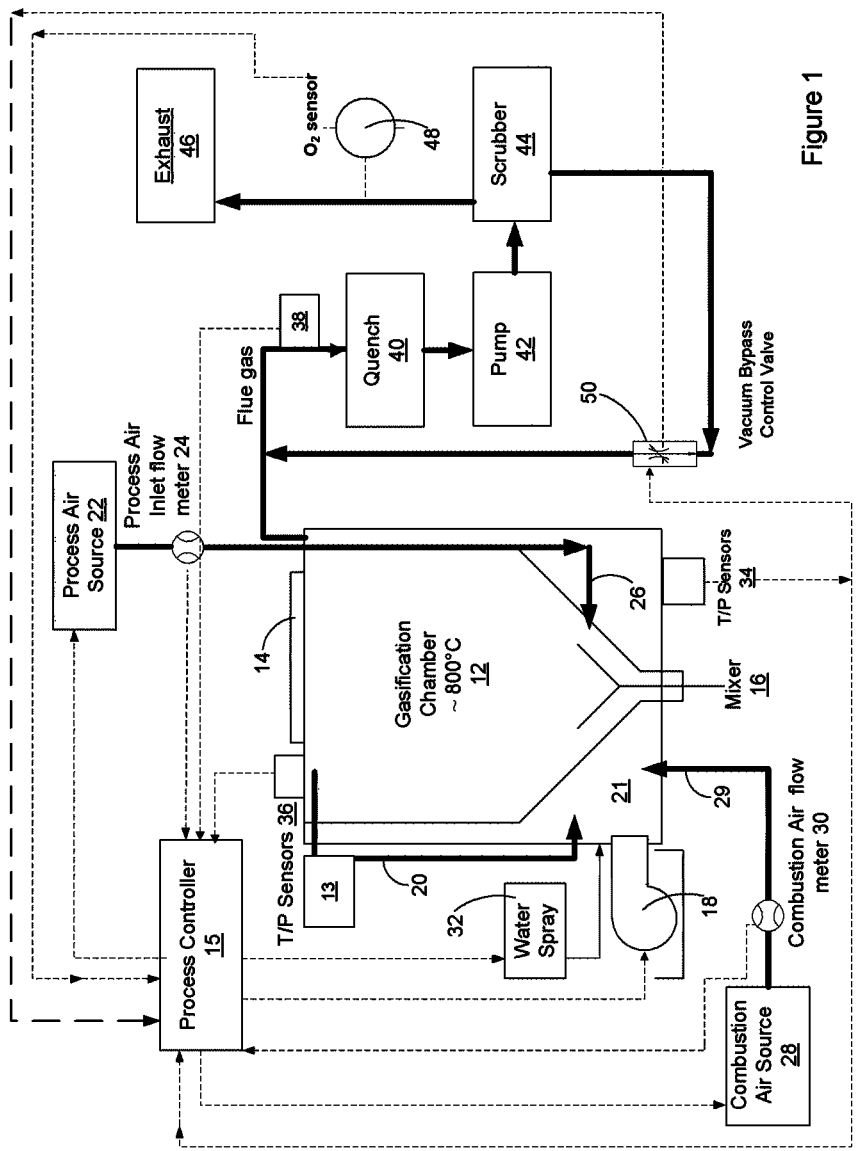
FIG. 1 is a block diagram of the gasifier according a primary embodiment of the invention.

The process begins by loading waste, for example a standard garbage bag of waste, into the gasification chamber 12 (see FIG. 1) though a loading hatch 14. The vacuum pump 13 is turned on and the diesel burner 18 is lit. While in the present embodiment, diesel fuel is chosen, it will be appreciated that any heat source able to provide the required heat energy and temperature can be utilized. The oxygen content of the final exhaust stream is measured by an $O_2$ sensor 48. The $O_2$ sensor 48 allows the process to control the oxygen in the combustion zone 21 to within regulated limits; usually 6%-12% in the flue gas. The gasification chamber 12's pressure is kept at a fixed set point, slightly below atmospheric. The process air 26 is pulled into the chamber 12 by the negative relative pressure inside. The process air 26 is preheated by being pulled through a small heat exchanging channel in the combustion zone 21. The flow rate is controlled by a proportional valve (part of source 22) and is monitored by a flow transmitter 24. The flow rate is measured by the flow transmitter 24 and the valve is adjusted to decrease or increase the flow rate accordingly. In operation, the process air feed rate is controlled between 0 and 20 scfm and is used to either accelerate or decelerate the gasification process and thus control the amount of synthesis gas produced. Reducing synthesis gas production can be required when combustion of synthesis gas generates temperatures that reaches a set point in the flue gas.

Following start up, as the process heats up the gasification chamber 12, the waste inside the chamber 12 begins breaking down into synthesis gas (syngas). The crude syngas 20 produced from the heated waste is fed into the combustion zone 21 through a port. The syngas begins to burn, resulting in an increased demand for $O_2$ in the combustion zone 21; this triggers a loop that opens the combustion air feed 28 to the combustion zone 21. By measuring the $O_2$ content of the exhaust flow and the combustion zone temperature using sensors 34, it is ensured that all syngas 20 is combusted fully. The exhaust stream $O_2$ content is kept at or above the set point established for complete combustion. A suitable set point can be between 6% and 12% $O_2$ content. The combustion air flow rate is monitored by a flow transmitter 30 and controlled by a proportioning valve in the source 28.

The invention disclosed herein is related to other technologies aimed at modifying the chemical form of the waste and specifically those causing the thermal oxidation of all organic waste. Pyrolysis, gasification and incineration (or combustion) are the main thermal processes used to modify the chemical form of waste; they are well known and used widely around the world. There are numerous patents describing all manners of operating these processes (usually on a continuous basis rather than batch operation) to improve their efficiency, reduce their environmental impact, process different types of waste, etc.

Pyrolysis operates in the complete absence of oxygen and thermally decomposes the organic waste into a carbon based char and a mixture of oils. It is not a process that is suitable for small-scale waste treatment. Neither the char nor the mixture of oils can be used by a small isolated community. As such, pyrolysis is a viable process only for relatively large-scale operations and for the treatment of specialty waste such as scrap tires and plastics.

Gasification is a process in which a controlled amount of oxygen is used to convert the organic molecules in the waste into a synthesis gas containing mostly carbon monoxide and hydrogen. The organic molecules within the waste, which are heated by both the hot internal reactor wall and the pre-heated process air, react with the oxygen in the process air to "gasify" into a mixture of carbon monoxide and hydrogen. Along with the products of gasification, nitrogen, which is introduced into the gasifier as part of the process air, is found in the synthesis gas. The final synthesis gas produced within the gasification zone of the reactor is a volumetric mixture of 50% nitrogen, 25% hydrogen and 25% carbon monoxide. Under certain operating conditions, some of the organic molecules decompose only partially to form smaller volatile hydrocarbons known as tars.

To date, nearly all efforts to design a very small waste treatment system have been based on incineration. In incineration, the organic waste is mixed with excess air and a combustible fuel. Consequently, the waste is completely burned and all carbon is converted to carbon dioxide.

The diesel burner 18 is shut off when temperatures in the combustion region 21 crest a set point of roughly 1100 Celsius, and the combustion air feed 29 is past a certain feed rate, roughly 25 cubic feet per minute; which indicates that enough syngas is being generated to maintain combustion without the diesel. The temperature in the combustion zone 21 is kept constant by use of a two stage diesel burner 18 for heating and by controlling the conditions in the chamber 12, including process air 22 feed rate, heating rate and mixing using mixer 16, to manage the amount of syngas 20 produced. In the event of highly energetic syngas production, water can be sprayed using sprayer 32 onto chamber 12 and or into the combustion region 21 to control temperature. Water spray evaporates and absorbs heat from the gasses; it is re-condensed and collected in the scrubber 44.

If the syngas quality falters and the temperature drops, then the diesel burner 18 can be relit to maintain sufficient temperatures for operation. To prevent formation of dioxins in the flue gas, the temperature of the flue gas is measured using sensor 38, preferably at a point right before the quench 40, and if the temperature drops below 650° C., then it is important to bring the temperature of the flue gas back up in order to avoid the potential formation of dioxins. For this purpose, the diesel burner 18 is restarted. Thus, temperature is measured in the combustion region 21 using sensor 34 and in the flue gas exhaust using sensor 38 prior to the quench 40.

Dioxin levels were measured at 0.11 $ng/m^3$ when flue gas was in the temperature range of 560° C. and 610° C. In some municipalities the legal limit is as low as 0.1 $ng/m^3$ and this limit is expected to be respected by using temperatures above 610° C.

While in the embodiment described above, the flue gas temperature is monitored, it will be appreciated that this can be measured indirectly by measuring the chamber 12 temperature.

The water spray nozzle 32 serves to cool the chamber 12 during shut down and to 'freeze' the ash in the bottom to prevent excessive gasification of the carbon in the ash; also the nozzle 32 serves to inject water to lessen the quality of syngas exiting the primary if temperatures are found to be too high in the combustion chamber 21. Temperatures in any chamber should not exceed 1250° C. The governing temperature within the gasification system is the temperature of the stainless steel at the bottom of the gasification chamber 12. This temperature may not exceed the working temperature range of the material. This is nominally set at 775 degrees Celsius.

The rate of crude syngas 20 production is measured by three parameters. First, the amount of air 22,26 which is required to ensure syngas combustion (plus a fixed amount of excess air) is measured; by stoichiometric deduction the syngas production rate is estimated. The second parameter is the position of the vacuum bypass control valve 50. Given that the combustion region 21 and the chamber 12 are kept at a constant pressure, the rate of crude syngas production can be measured by the position of the vacuum bypass control valve 50 (e.g. without relying on controlling process air source 22). Negative pressure (e.g. 90 kPa absolute) is maintained in the combustion chamber 12 by the liquid ring vacuum pump 42. The degree of vacuum is controlled by the vacuum bypass valve 50. It will be appreciated that other arrangements can be provided to control pressure.

As syngas 20 production begins, the pressure rises in the chamber 12 and the vacuum bypass control valve 50 closes to maintain enough suction to keep the pressure constant, the position of valve 50 is proportional to the syngas production rate. The third parameter is the temperature of chamber 12 (as measured by sensor 36); gasification can be estimated to begin at chamber temperatures above 350 degrees Celsius.

Once it is determined that syngas is produced, the combustion air 28,29 is injected immediately to ensure constant exhaust emissions at the exit 46. Determination of the correct amount of air is calculated by the process controller 15 based on the parameters described above. The process controller 15 can comprise fixed circuitry, a microcontroller, FPGA, DSP, or a more complete computer programmed to perform the control loop function. Additionally, the controller 15 can also record measured values during operation and provide reports or logs of operation. The control loop for this step will now be described.

The transition from burning diesel fuel to burning syngas is done with the aid of a small pilot burner (part of burner 18) which burns diesel fuel. The small burner is located in the combustion region 21 at the entrance of the syngas 20 into the combustion zone 21. The pilot flame is used to ensure that the syngas is combusted fully in the early stages of syngas production, when the quality of the syngas is less than optimal. This window of 'poor' syngas lasts approximately 10 minutes.

In one embodiment, the combustion region 21 has two burners, one main and one pilot burner. Alternatively, a two stage burner can be used. It is the main burner which is shut off when temperatures rise as mentioned above. The mixer 16 slowly turns the waste in the chamber 12 causing the gasification reaction to occur more rapidly and steadily by putting more waste in contact with the hot floor and process air 22,26 than would be the case if the waste were stagnant. Also process air channelling problems are avoided by keeping the waste in motion. A motor (not illustrated) is provided to turn the mixer 16. The mixer motor is turned on by controller 15 when temperatures inside the chamber 12 reach 350° C. The mixer 16 should stay on at all times although it is possible to stop it as a way to reduce syngas production in the case that syngas production is too great.

An automated loop controls the resistance of the motor to jamming. If the motor and shaft force against an obstruction in the chamber 12, the current to the motor will spike. This spike is monitored and will cause the motor to reverse directions. If the motor reverses direction three times in a minute, it shuts down and can be restarted manually.

The scrubber 44 is a wet scrubber. The water in the scrubber 44 becomes acidic due to the combustion exhaust passing through the scrubber. The acidity can be neutralized by the addition of liquid caustic soda into the recirculation line. A pH meter can be used to monitor the acidity in the scrubber and open a valve to the caustic tank which can be gravity fed into the recirculation line based on a set pH value, eg. 7.

Figure 3:
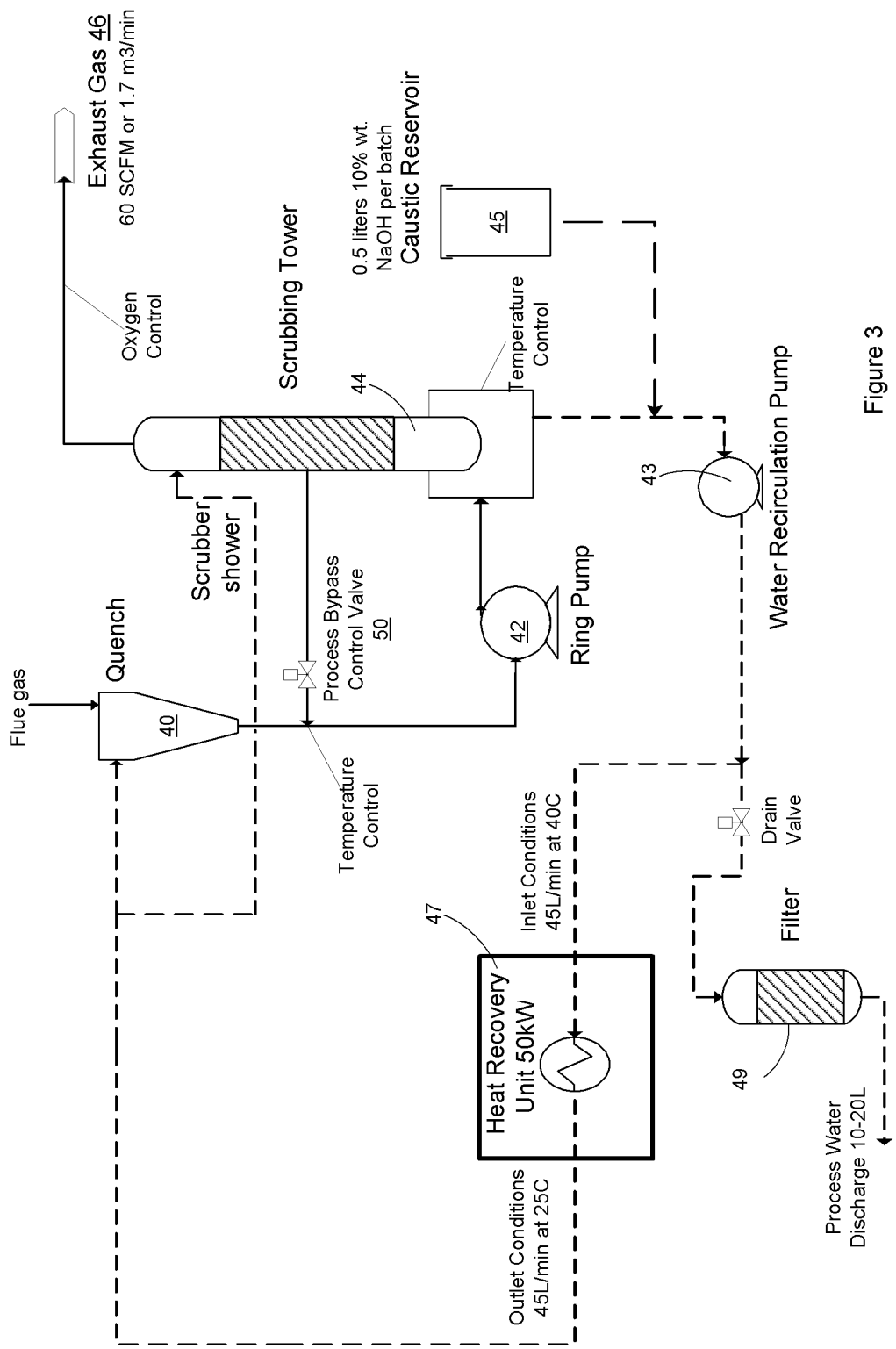
FIG. 3 is a more detailed diagram of the quench and scrubber system according to one embodiment.

FIG. 3 shows details of one embodiment of the quench 40, pump 42 and scrubber 44 arrangement illustrating also a water circulation pump 43, caustic reservoir 45, and discharge filter 49. The water used in the quench 40 and scrubber 44 is circulated using pump 43 through a heat exchanger 47, namely a 50 kW heat recovery unit, i.e. corresponding to the water being cooled from 40° C. to 25° C. at a rate of 45 L/min. The cooled water is then used in the quench 40 and for the scrubber shower of the scrubbing tower 44. While the 10% NaOH from reservoir 45 can be added at an amount of 0.5 litres per batch of waste, it will be appreciated that it can be added as a result of measuring pH, either manually or automatically under the control of the controller 15. When the gasifier operates in a continuous mode with waste added as the processing is in progress, balancing pH of the recirculation loop is best done in a continuous way. Excess water in the recirculation loop is emptied through a drain valve and a filter 49. The amount of water drained can be about 10 to 20 L per batch. The drain valve can be controlled automatically by controller 15 in response to water level sensors in the scrubber 44.

In some embodiments, the level of water in the scrubber 44 should be kept constant. The liquid ring vacuum pump 42, which controls the vacuum of the system, can rely on a constant flow from the recirculation line which is in turn fed by the scrubber water reservoir. The process generates water and some water is exhausted as vapor, the exact amounts may vary, hence the scrubber 44 is equipped with an automatic fill and drain which are controlled by level sensors. For example, two vibrating fork level sensors can be used in the scrubber. They send a signal when they are under water versus in air. The two forks are located 2 inches apart, one above the other. The desired water level is between the two sensors, thus the lower sensor is always under water and the upper sensor is always above water. If the lower sensor is exposed due to a decreasing water level, the fill valve will activate and fill the scrubber with fresh water until the lower sensor is submerged. If the upper sensor is submerged due to a rising water level, then the drain will open until the upper sensor is above water.

The scrubber water temperature is an important parameter that affects the suction capabilities of the liquid ring vacuum pump 42. The scrubber water should not exceed 50 degrees Celsius. The scrubber water is re-circulated to the quench 40. The quench mixed temperature should not exceed 60 degrees Celsius. The 'mixed temperature' is the temperature of the flow of exhaust gas and quench water between the quench 40 and the ring pump 42. All the water in the system is closed loop and a heat exchanger 47 is used to remove any excess heat being built up in the recirculating water.

The heat recovered from unit 47 can be used for building air heating purposes (either direct hot water radiators or in a forced air furnace), for heat storage, for pre-heating hot water, as a heat source for heat pumps, or other industrial uses.

It will be appreciated that the heat exchanger 47 removes most of the heat generated by the whole gasification system, as the resulting exhaust gas is cooled to about 40° C. This low temperature exhaust can facilitate installation of the gasification system, since conventional heating or kitchen ventilation ducts can be used to vent exhaust gas to the outside of the building instead of using high temperature chimney ducts. Also, the single point for heat recovery is simpler than recovering heat in a gasification system that uses a secondary gasifier and cleans the synthesis gas, since heat then can be recovered both in the syngas scrubber and then separately in the flue gas.

It will be appreciated that many variations from the above-described embodiments are possible. For example, the burner can be substituted by a variety of heat sources, and in some cases propane or natural gas will be preferred as a combustible fuel over diesel.

Figure 2:
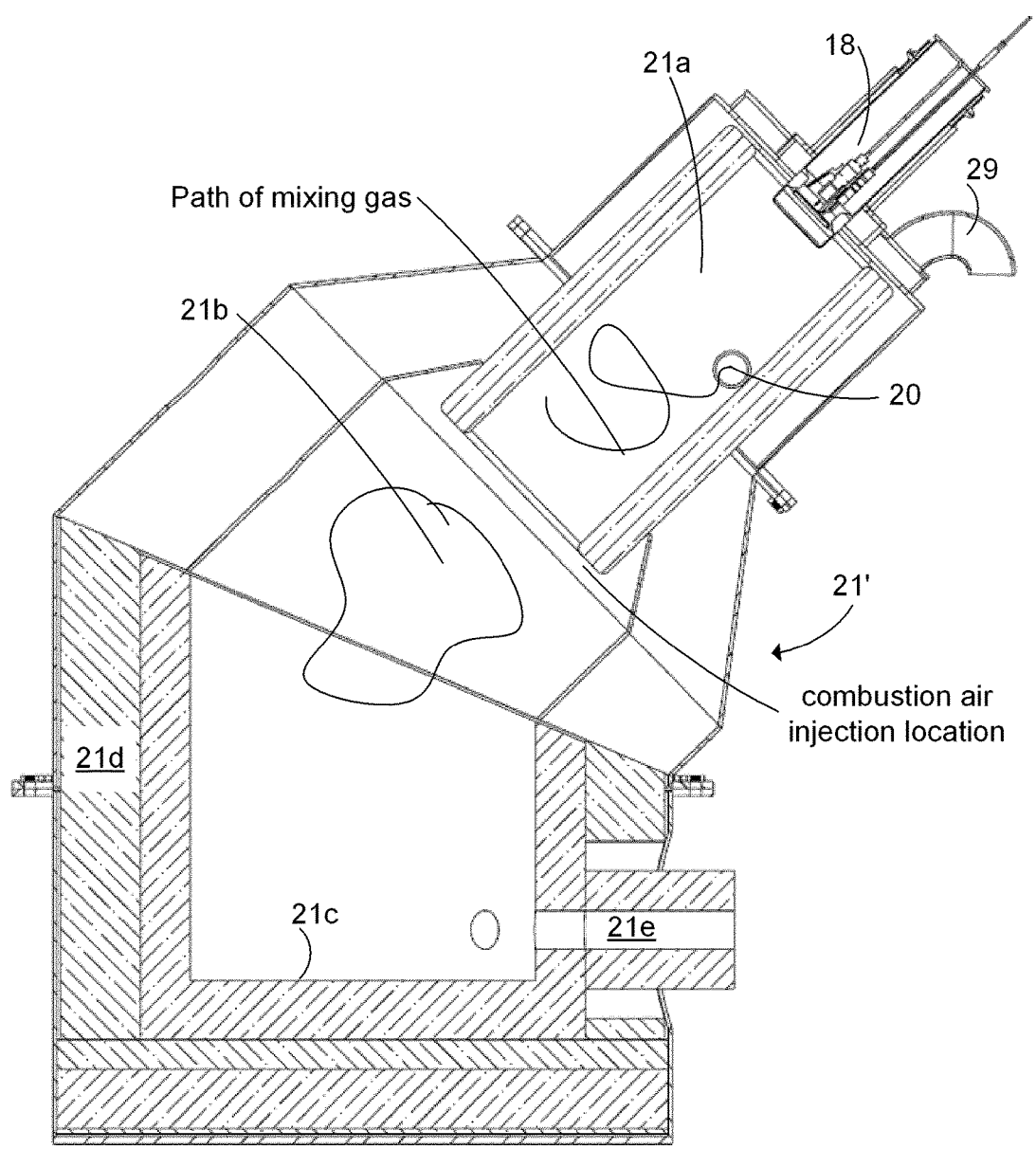
FIG. 2 is a sectional elevation view of a combustion chamber for producing combustion gases to be communicated with a heat exchanger of a gasification chamber according to a second embodiment.

The combustion zone 21 can be substituted for a combustion chamber 21' as shown in FIG. 2. This can be done to increase the capacity of the system with regards to the burning of syngas and consequently the waste processing capacity of the system. The combustion chamber 21' receives the syngas 20 from the gasification chamber 12. The syngas 20 is drawn into the chamber 21' by virtue of it being at a lower pressure than the gasification chamber 12. The chamber 21' has a cylindrical mixing region 21a that receives the flow of syngas 20 tangentially to spiral and flow into a burning region 21b where combustion air from port 29 is injected in an ignition region. The chamber 21' is provided with a refractory lining 21c, and suitable insulation 21d. The mixing region 21a is where the syngas enters the chamber and is put into contact with the pilot burner, namely part of the diesel burner 18. The syngas 20 is heated and mixed in the mixing region. The syngas is then forced into contact with the combustion air 29 where it ignites and burns. The exhaust 21e from the combustion chamber 21' is directed into a heat exchanging region surrounding chamber 12, where the heat from the exhaust gas is transferred back to the process.

Additional details of a gasifier system is found in co-pending U.S. patent application Ser. No. 12/445,455 filed Apr. 13, 2009, the content of which is incorporated herein by reference.

The gasification system shown in the above embodiments is a small scale device that operates on batches of waste, for example, a single, large, domestic garbage bag of waste. With a system of this scale, the amount of syngas produced is sufficient to drive the gasification process for a large part of a batch cycle, however, for most domestic waste, there is not significant excess of synthesis gas to be used for other purposes. The present invention can be applied to larger installations or to continuous gasification systems. In these cases, there can be significant excess syngas produced. It will be appreciated that crude synthesis gas to be used for purposes other than driving the gasification process can be processed by a secondary gasifier and scrubbed so as to produce a clean syngas supply, in addition to using the crude syngas as a fuel separate from the combustion providing heat to the gasification chamber.

When waste is continuously fed into chamber 12, as can be done using a chute or feed screw mechanism, it is possible to control the amount of waste placed in the chamber 12 to keep the temperature of the chamber above, for example, 650 C, so that flue gas remains sufficiently high. Alternatively, a solid fuel source, such as a suitable coal could be initially added to the chamber 12 so that the start-up phase can be below 600° C. without production of dioxins. Once temperatures in the chamber 12 reach about 650° C., the addition of waste can proceed without producing dioxins in the flue gas.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description.

What is claimed is:

1. A gasification waste processor comprising:
a gasification chamber having a controlled process air inlet and a crude synthesis gas outlet;
a combustion zone or chamber having a primary burner configured to burn an external fuel, a crude synthesis gas feed connected to said crude synthesis gas outlet and a controlled combustion air inlet to combust all of said crude synthesis gas;
a heat exchanging region surrounding at least part of the gasification chamber to transfer heat from all exhaust gas of said combustion zone or chamber to said gasification chamber for providing all process heat to said gasification chamber from said exhaust gas; and
a process controller configured to control said process air inlet to:
control the oxygen content of said gasification chamber to enable a production of crude synthesis gas by gasification of waste during operation of said gasification waste processor to convert organic molecules into said synthesis gas containing mostly carbon monoxide and hydrogen;
increase said oxygen content to accelerate said production of crude synthesis gas; and
decrease said oxygen content to decelerate said production of crude synthesis gas when a temperature of said flue gas reaches a set point.

2. The processor as defined in claim 1, further comprising a quench for quenching flue gas from the combustion chamber, a scrubber for decontaminating quenched flue gas and a temperature sensor for measuring a temperature of said flue gas right before quenching, wherein said controller controls operation of said primary burner to combust external fuel when said flue gas temperature indicates a temperature at risk of forming dioxins.

3. The processor as defined in claim 1, further comprising an oxygen sensor for sensing oxygen levels in said flue gas, wherein said controller controls said combustion air inlet as a function of oxygen levels sensed in said flue gas.

4. The processor as defined in claim 1, further comprising a water spray system for cooling a temperature in said combustion chamber.

5. The processor as defined in claim 4, further comprising at least one temperature sensor for sensing temperature in said combustion chamber, said controller activating said water spray system when combustion of crude synthesis gas leads to high temperatures in said combustion chamber.

6. The processor as defined in claim 2, wherein said controller causes said acceleration of said production of crude synthesis gas when said flue gas temperature after heat exchange indicates a temperature at risk of forming dioxins.

7. The processor as defined in claim 1, further comprising a mixer operative within said gasification chamber, wherein said production of crude synthesis gas is accelerated by operation of said mixer.

8. The processor as defined in claim 1, wherein said gasification chamber comprises a latched hatch adapted to admit placement of said waste in said chamber prior to gasification.

9. The processor as defined in claim 1, wherein said gasification chamber comprises a latched hatch adapted to admit placement of said waste in said chamber prior to gasification, said process controller being adapted to control operation of at least said primary burner to process said waste in process cycles corresponding to single batches.

10. The processor as defined in claim 1, further comprising a water quench for quenching flue gas and a heat recovery system connected to quench water.

11. The gasification waste processor of claim 1 wherein said controller is configured to cause said acceleration of said production of crude synthesis gas by controlling a feed rate of said process air.

12. The processor as defined in claim 1, wherein said primary burner comprises a two-stage burner located in the combustion chamber or region at an entrance of the crude synthesis gas into the combustion chamber or region.

13. The processor as defined in claim 12, wherein said two-stage burner is a diesel fuel burner.

14. A gasification process comprising:
heating matter in a gasification chamber having a controlled process air inlet to a temperature sufficient to produce crude synthesis gas fed to a combustion chamber or zone also having an external fuel supply;
combusting the external fuel supply and all of the crude synthesis gas to generate hot combustion exhaust gases;

exchanging heat between all of said combustion exhaust gases and the gasification chamber or zone to provide all process heat to said gasification chamber or zone from said exhaust gases;

controlling said external fuel supply to reduce contribution of heat by said combustion of said external fuel supply as heat is provided by combustion of crude synthesis gas; and controlling said process air inlet, to control the oxygen content of said gasification chamber to convert organic molecules into said crude synthesis gas containing mostly carbon monoxide and hydrogen, to decelerate production of crude synthesis gas in said crude synthesis gas feed by decreasing said oxygen content when combustion of said crude synthesis gas generates temperatures that reach a setpoint in the flue gas, and to increase said oxygen content to accelerate said production of crude synthesis gas.

15. The process as defined in claim 14, further comprising quenching and scrubbing the flue gas, wherein heat is recovered from said quenching and scrubbing.

16. The process as defined in claim 14, wherein said process is performed in batch mode on a quantity of said matter.

17. The process as defined in claim 14, further comprising:
quenching and scrubbing said flue gas; and
monitoring flue gas temperature, right before quenching, and controlling process parameters to maintain said flue gas temperature above a level at which dioxins can form.

18. The process as defined in claim 17, further comprising removing heat from said flue gasa1 by low temperature heat exchange with water used in said quenching and scrubbing.

* * * * *